United States Patent [19]

Ikeda

[11] Patent Number: 5,274,511
[45] Date of Patent: Dec. 28, 1993

[54] SERVO SIGNAL RECORDING METHOD AND APPARATUS

[75] Inventor: Katsumi Ikeda, Kanagawa, Japan

[73] Assignee: Sony Corporation, Tokyo, Japan

[21] Appl. No.: 744,422

[22] Filed: Aug. 13, 1991

[30] Foreign Application Priority Data

Aug. 14, 1990 [JP] Japan .................................. 2-214685

[51] Int. Cl.⁵ .......................... G11B 5/02; G11B 5/596
[52] U.S. Cl. ......................................... 360/55; 360/75; 360/77.02; 360/77.08; 360/135
[58] Field of Search ............... 360/77.02, 78.04, 78.09, 360/78.11, 55, 75, 135, 77.08

[56] References Cited

U.S. PATENT DOCUMENTS

| | | | |
|---|---|---|---|
| 4,488,187 | 12/1984 | Alaimo | 360/77.02 |
| 4,590,527 | 5/1986 | Warner | 360/78.11 |
| 4,835,632 | 5/1989 | Shih et al. | 360/77.02 |
| 4,878,135 | 10/1989 | Makino et al. | 360/78.11 |
| 4,974,109 | 11/1990 | Hoshimi et al. | 360/78.11 |
| 5,027,233 | 6/1991 | Berti et al. | 360/77.02 |
| 5,051,851 | 9/1991 | Sakurai | 360/78.04 |
| 5,140,476 | 8/1992 | Kim | 360/77.02 |
| 5,162,955 | 11/1992 | Burdenko | 360/77.02 |
| 5,165,082 | 11/1992 | Tomiyama | 360/77.02 |

FOREIGN PATENT DOCUMENTS 0055787 3/1988 Japan .................. 360/77.02

OTHER PUBLICATIONS

"Method to Measure the Amount of Off-Track" IBM Tech. Disclosure Bulletin vol. 31 No. 2 Jul. 1988 pp. 269–270.
Patent Abstracts of Japan, vol. 13, No. 85 (P-834) (3433) Feb. 27, 1989 & JP-A-63 266 625 (Mitsubishi) Nov. 2, 1988, abstract.
Patent Abstracts of Japan, vol. 12, No. 383 (P-770) Oct. 13, 1988 & JP-A-63 127 416 (Sony) May 31, 1988, abstract.
Patent Abstracts of Japan, vol. 12, No. 417 (P-782) Nov. 7, 1988 & JP-A-63 154 916 (Sony) Jun. 28, 1988, abstract.

Primary Examiner—John Zazworsky
Attorney, Agent, or Firm—Lewis H. Eslinger; Jay H. Maioli

[57] ABSTRACT

An external position detector is mounted on a head arm that also carries a transducer for tracking a magnetic disk. When the head arm is moved at constant speed, the position detector produces an output signal that is periodic but has a measurable pitch error or pitch unevenness. The periodic output signal is measured to determine the pitch error, and an amount of compensation required to compensate for the measured pitch error is calculated. A value of the periodic output signal corresponding to the amount of compensation and therefore corresponding to an absence of pitch error is calculated, and a servo signal is recorded on the magnetic disk at a location corresponding to the calculated value of the periodic output signal. The pitch error is thereby fully compensated, and the servo signal is recorded with precision.

8 Claims, 7 Drawing Sheets

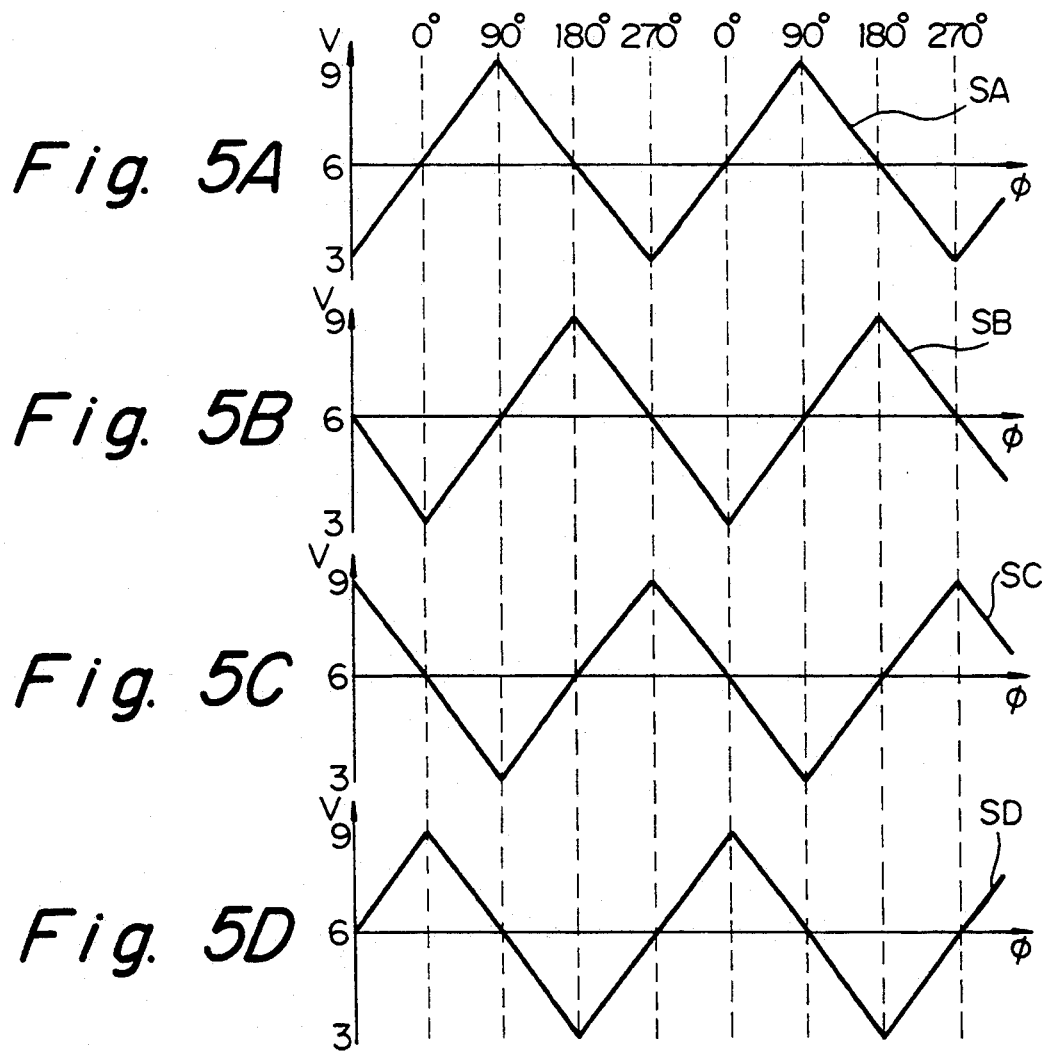

SERVO SIGNAL RECORDING METHOD AND APPARATUS

BACKGROUND OF THE INVENTION

1. Field of the Invention

The present invention relates to a method of recording a servo signal and more particularly to a novel and highly accurate method of recording a servo signal which is suitable for use with a hard disk or the like. It also relates to apparatus for carrying out the method.

2. Description of the Prior Art

A method of tracking a hard disk by using an external sensor is disclosed in Japanese laid-open patent publication No. SHO 63-154916. In this method, a Voice coil motor is driven so as to move a head arm. With a position detector having a 4-phase optical sensor, the position of the head arm is obtained as a detection output. The head is tracked by comparing the detection output of each phase with a data track.

With only the external sensor, the accuracy of the tracking of the head is limited. To improve the accuracy, in a method that has been widely used thus far, the head is coarsely moved with the output of the external sensor and then it is finely moved to a target track with a servo signal which has been formed on the disk at the factory. Thus, if there is a deviation between the center of a track detected by the external sensor and the center of a data track on the disk because of deterioration due to age or some environmental change, it can in principle be compensated and the head can in principle be precisely tracked.

However, the servo signal mentioned above is written on the disk in accordance with the center of the track, which is detected by the external sensor after the drive unit has been assembled. Since the accuracy of the track pitches depends on the pitch accuracy of the external sensor, a problem of unevenness of pitches due to manufacturing tolerances arises. If the unevenness of pitches is pronounced, cross talk tends to occur, thereby degrading the read/write property. On the other hand, if the width of the guard band is increased to prevent the occurrence of cross talk, the track width is excessive and the disk storage capacity is not efficiently utilized.

To solve the problems mentioned above, the present applicant has proposed a method of writing a servo signal as disclosed in Japanese patent application No. SHO 63-308238. In this method, before a servo signal is written onto the disk, the unevenness of pitches intrinsic to the external sensor is checked. After the unevenness of pitches is compensated, the servo signal is written onto the disk. In other words, the unevenness of pitches intrinsic to the external sensor is compensated by moving the head from the center of the track detected by the external sensor a distance sufficient to effect the compensation and then writing the servo signal.

In the method of the earlier filed application, when the head is moved to effect the compensation while the output value of the external sensor is monitored, it is assumed that the output of the external sensor and the amount of movement of the head have a linear relationship. Actually, however, the relationship between the output of the external sensor and the amount of movement of the head is nonlinear. Thus, even after the head is moved for the purpose of effecting the compensation, there remains an unevenness of pitches to some degree.

OBJECTS AND SUMMARY OF THE INVENTION

An object of the present invention is to provide a method of writing a servo signal in such a manner as to compensate for the unevenness of pitches due to nonlinearity between the output of the external sensor and the amount of movement of the head. Another object of the invention is to obtain better compensation for the unevenness of pitches than has been possible heretofore. Another object of the invention is to provide a method of writing a servo signal that makes the manufacturing tolerance for the external sensor less critical so that the manufacturing tolerance can be increased with no overall loss, and even with a gain, of accuracy.

The foregoing and other objects of the invention are obtained by providing a method of recording a servo signal by which tracks on a disk can be accurately followed by a transducer head. The method comprises the steps of: mounting on a head arm a position detector that, when the head arm is moved at constant speed, produces an output signal that is periodic but has a measurable pitch error; moving the head arm at constant speed; measuring the periodic output signal to determine the pitch error; calculating an amount of compensation required to compensate for the measured pitch error; calculating a value of the periodic output signal corresponding to the amount of compensation and therefore corresponding to an absence of pitch error; and recording a servo signal on a disk at a location corresponding to the calculated value of the periodic output signal.

In accordance with an independent aspect of the invention, apparatus is provided for carrying out the method.

Thus in accordance with the invention, the unevenness of pitches intrinsic to the position detector is fully compensated. By the same token, the nonlinearity between the output signal of the position detector and the amount of movement of the head is also compensated.

BRIEF DESCRIPTION OF THE DRAWINGS

A better understanding of the objects, features and advantages of the invention can be gained from a consideration of the following detailed description of the preferred embodiment thereof, in conjunction with the appended figures of the drawing, wherein a given reference character always designates the same element or part, and wherein:

FIGS. 5A through 5D are waveform diagrams showing in lines A, B, C and D respective detection signals of the position detector of FIG. 1;

DESCRIPTION OF THE PREFERRED EMBODIMENT

As explained in detail below with reference to the accompanying drawings, the present invention involves recording a servo signal for tracking a disk 5 by using an output of an external position detector 6, moving a head arm 1 at a constant speed so as to measure a pitch error of the position detector 6 by using an output signal therefrom, calculating an amount of compensation by using the error, calculating output values $V_{CR1}$ to $V_{CR4}$ of the position detector 6 in accordance with the amount of compensation, and recording a servo signal on the disk 5 when the calculated output values $V_{CR1}$ to $V_{CR4}$ of the position detector 6 are obtained.

The present invention is especially adapted to writing a servo signal on a fixed, hard magnetic disk.

Figure 1:
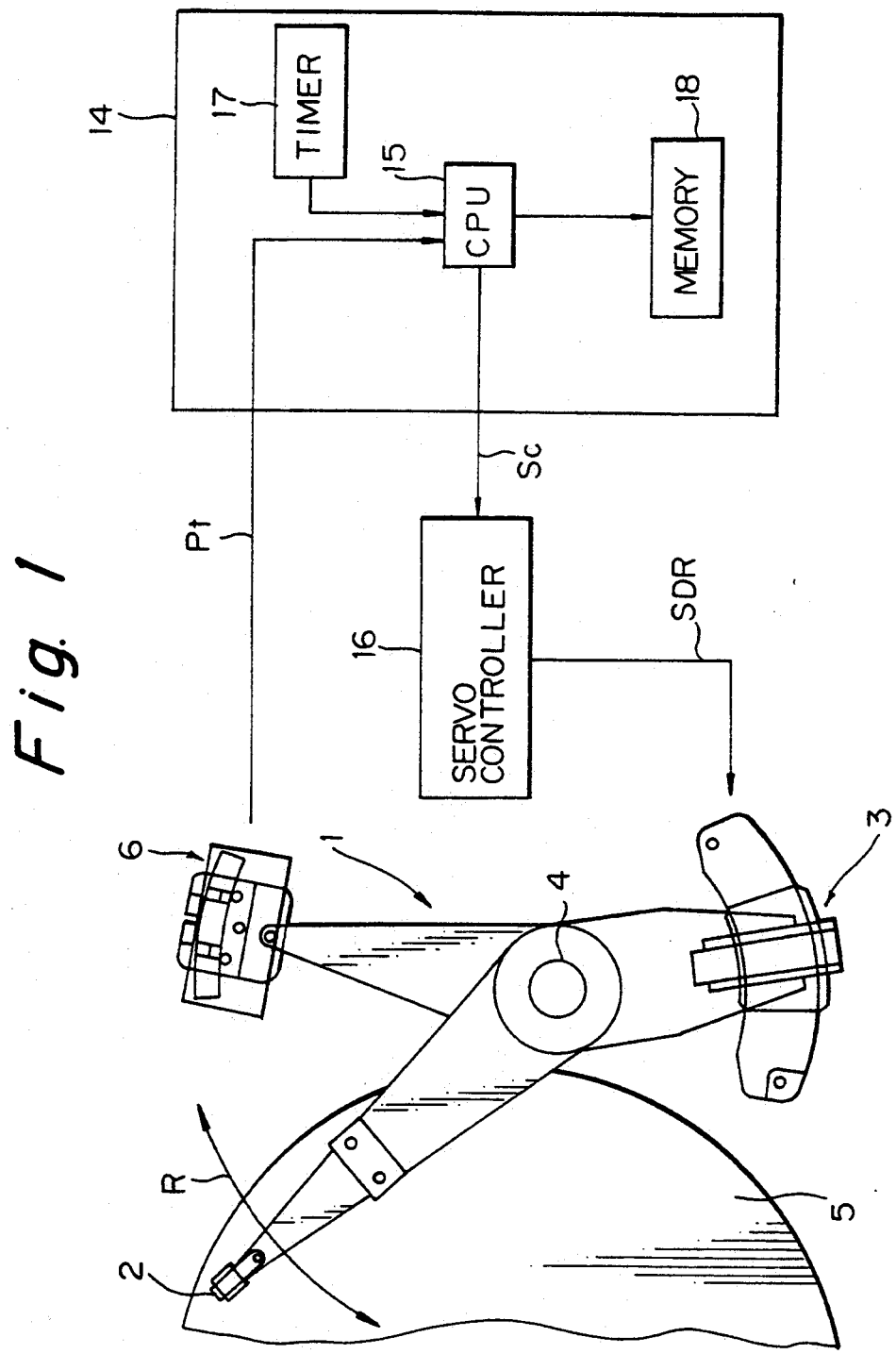
FIG. 1 is a schematic plan view and block diagram showing a preferred embodiment of the present invention during a reading operation that enables compensation for a manufacturing tolerance of a position detector and for nonlinearity of its output.
Figure 3:
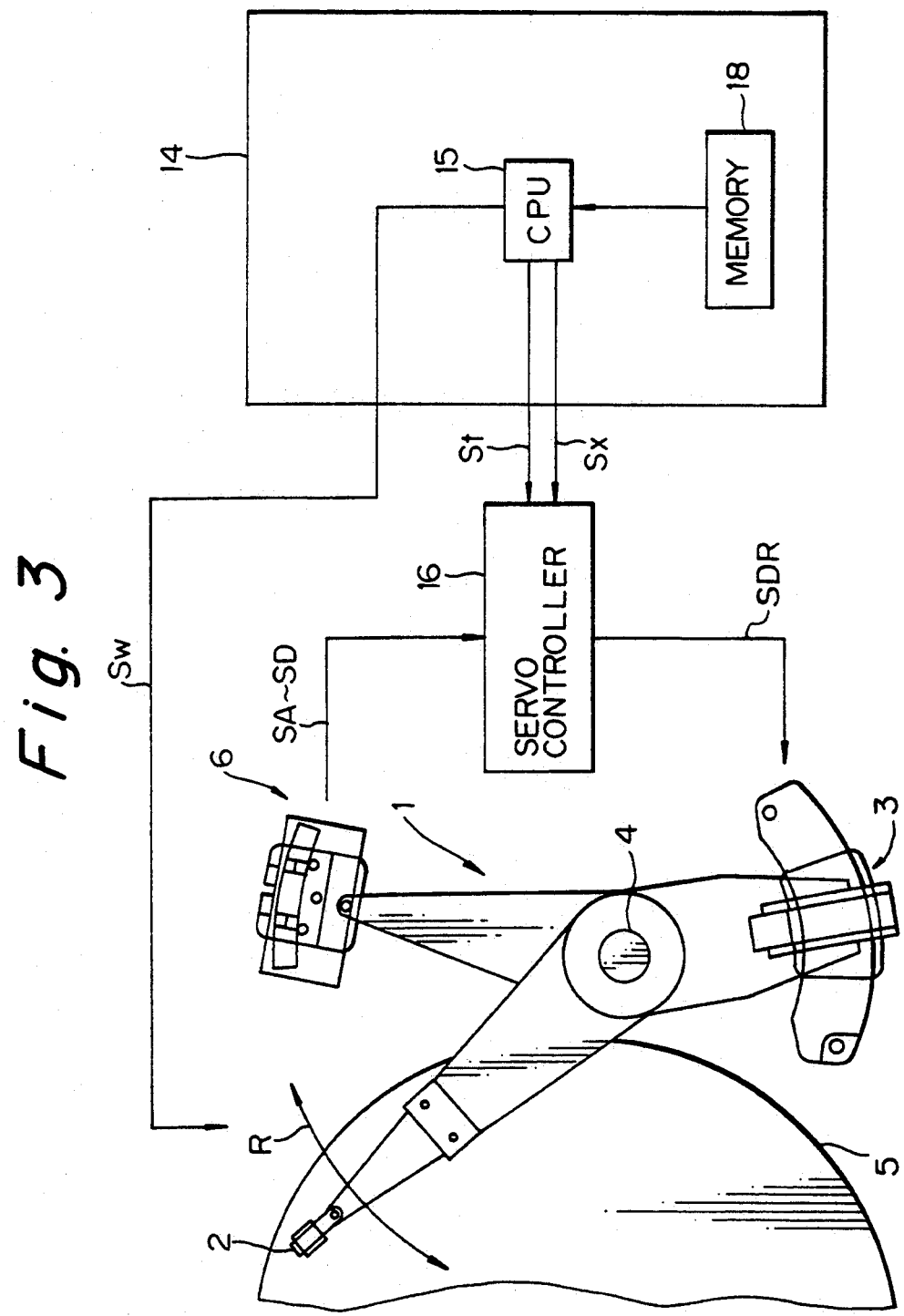
FIG. 3 is a view similar to FIG. 1 but showing a writing operation.

In FIGS. 1 and 3, a transducer head 2 mounted at one end of the head arm 1 is rotatably moved around a rotation shaft 4 by a voice coil motor 3. Thus, the head 2 is moved in the radially inward or radially outward direction (i.e., in either direction indicated by a double-headed arrow R in FIG. 1) of the magnetic hard disk 5. The optical position detector 6 is mounted at a second end of the head arm 1.

Figure 2:
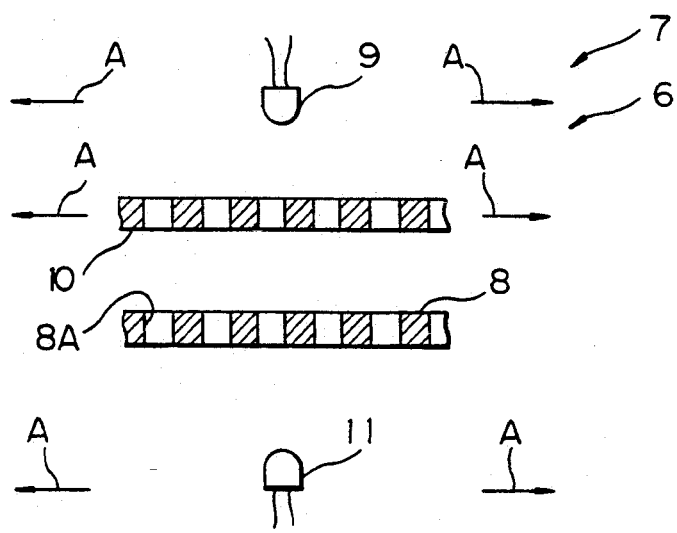
FIG. 2 is schematic sectional view in elevation showing the construction of a portion of a position detector employed in the apparatus of FIG. 1.

The position detector 6 comprises a movable sensor 7 and a fixed scale 8 as shown in FIG. 2. The movable sensor 7 comprises a light emitting diode or LED 9, a four-part reticle 10 (shown in more detail in FIG. 4B), and four photodiode light receivers 11 (only one being illustrated). The reticle 10 is formed of a substantially opaque material, has slits each nominally 50 μm (micrometers or microns) wide formed at intervals of nominally 100 μm, and is supported by a transparent glass or the like. The light emitter 9 and the reticle 10 are molded or otherwise formed as a rigid, unitary structure and mounted on the head arm 1.

Figure 4A:
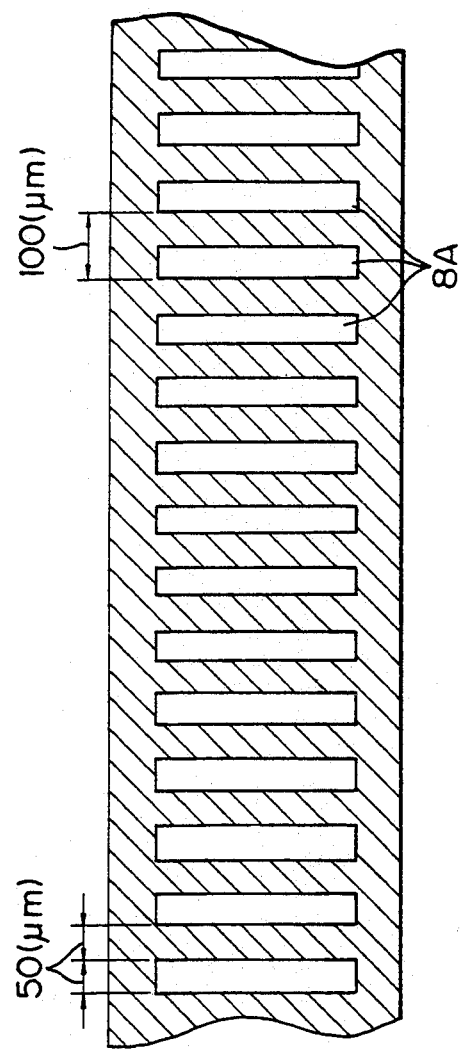
FIG. 4A is a plan view showing a fixed scale employed in accordance with the invention.

The fixed scale 8 (FIG. 4A) is formed of a substantially opaque material, has a pattern with a spacing similar to that in the reticle 10, and is supported by a transparent glass or the like. The movable light receivers 11 (FIG. 2) are positioned below the fixed scale 8. The sensor 7 (including the LED 9, reticle 10 and light-sensitive diodes 11) is movable with the head arm 1 in either direction shown by arrows A in FIG. 2. Hatched portions of the reticle 10 and the scale 8 are opaque and formed by a metal vaporization method. As the head arm 1 is moved, the openings formed by the scale 8 and the reticle 10 for the passage of light vary in width, and accordingly a triangular wave detection signal is obtained from each of the light receivers 11.

Figure 4B:
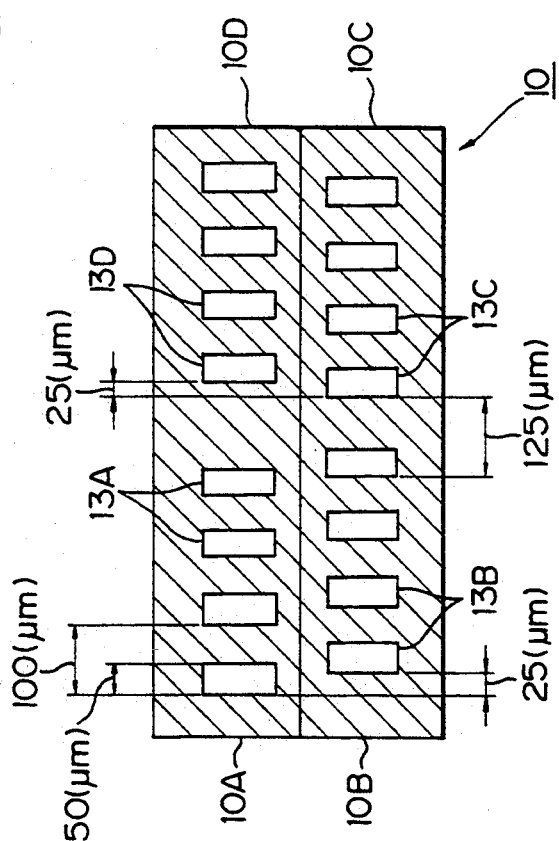
FIG. 4B is a plan view showing a movable reticle employed in accordance with the invention in cooperation with the scale of FIG. 4A.

The track intervals of the magnetic disk 5 may be narrow as 25 μm. They are thus narrower than the slit intervals of the scale 8 and the reticle 10, which presents a measurement challenge. As shown in FIG. 4B, the reticle 10 is formed with four reticle parts 10A, 10B, 10C, and 10D having slits 13A, 13B, 13C and 13D, respectively. The slits 13A, 13B, 13C, and 13D, each having a width of nominally 50 μm, are disposed at pitches of nominally 100 μm and so that the slits 13B and 13C are displaced from the slits 13A and 13D by nominally 25 μm. The separation between the right-hand slit 13A and the left-hand slit 13D exceeds that between the right-hand slit 13B and the left-hand slit 13C in view of the directions of the offsets.

The four light-receiving diodes 11 one of which is illustrated in FIG. 2 are respectively disposed below the reticles 10A to 10D of FIG. 4B. From these diodes, four triangular-wave detection signals SA, SB, SC, and SD are obtained whose phases $\phi$ differ one from the next by 90° as shown in FIGS. 5A through 5D, respectively. The voltage level of each of the detection signals SA to SD cyclically rises and falls within the range, for example, of 3 V to 9 V. A cross point at which the detection outputs SA to SD exceed a reference voltage Vr (for example, 6 V) is determined for the center of each track. In this embodiment, the center of each track is detected by moving the sensor 7 while the scale 8 is fixed (refer again to FIG. 2). Of course, the invention is not limited to such a construction; it is clearly possible to move the scale 8 while the sensor 7 is fixed or even to move both the sensor 7 and the scale 8 so that the requisite relative motion between the two is obtained.

Figure 6:
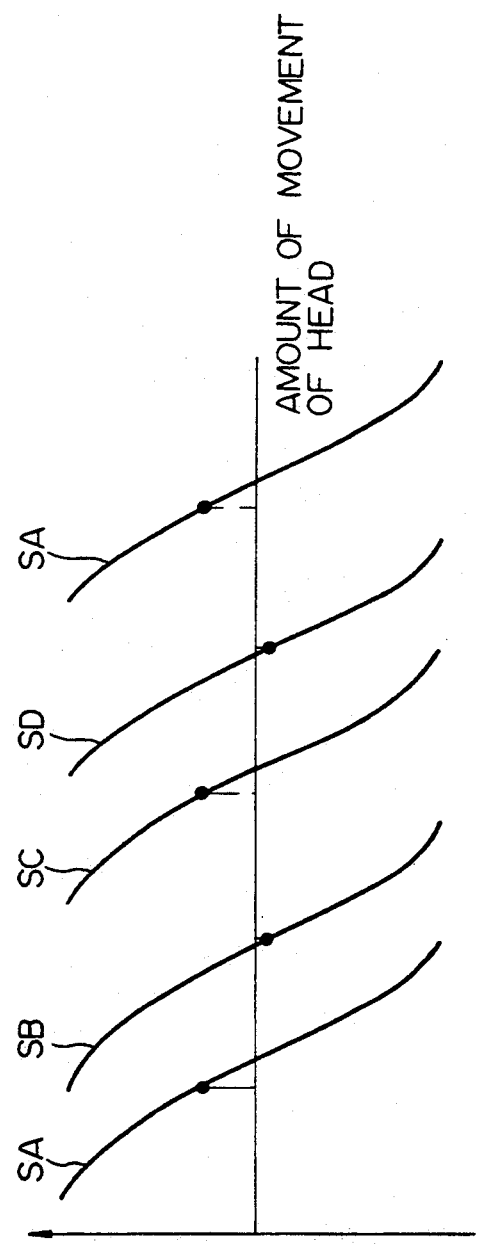
FIG. 6 is a waveform diagram showing the unevenness of pitches of detection signals and their nonlinearity; an FIGS. 7, 8, and 9 are diagrams helpful in understanding the method of calculating the amount of compensation in accordance with the invention.

A servo signal is written on the magnetic disk 5 in accordance with the 4-phase detection signals SA to SD of the position detector 6, after some signal processing as described below. As FIG. 6 shows, the output signals of the four phases of the position detector 6 may correspond to pitches that are uneven. Moreover, the output signals change nonlinearly with the amount of movement of the sensor 7 with respect to the scale 8. Nevertheless, in accordance with the invention, the servo signal is written on the magnetic disk 5 free from the unevenness of pitches and from the effects of nonlinearity.

A. Calculation of Unevenness of Pitches Intrinsic to Position Detector 6

As shown in FIG. 1, a constant-movement command Sc is sent from a CPU 15 of a microcomputer 14 to a servo controller 16. The servo controller 16 develops a drive signal $S_{DR}$ in accordance with the constant movement command signal Sc. The drive signal $S_{DR}$ causes the head arm 1 to move in the radial direction R of the magnetic disk 5 at a constant speed.

Figure 7:
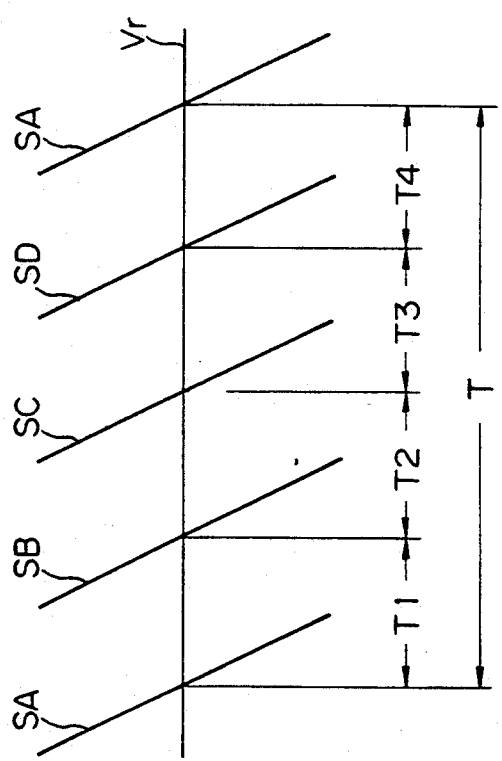

Whenever during movement of the head arm 1 an output signal of the position detector 6 crosses a predetermined reference voltage, Vr for example, a detection pulse Pt is generated. The detection pulses Pt are sent to the CPU 15. The intervals between successive detection pulses Pt are measured by means of a timer 17 in the microcomputer 14. The timer has a frequency high enough to obtain a precise measurement of the intervals. In FIG. 7, respective time intervals of the detection pulses Pt are represented by T1, T2, T3 and T4. The total interval T (=T1+T2+T3+T4) is one period of the 4-phase detection signal. Because of unavoidable manufacturing tolerances, the intervals T1 to T4 will vary slightly. The pitch data of the position detector 6 obtained in the manner described above is written in a memory 18 of the microcomputer 14 (FIG. 1) for later readout (FIG. 3).

In this embodiment, since four reference tracks are provided on both the inner periphery side and the outer periphery side of the magnetic disk 5, the unevenness of pitches is measured for several tens of tracks at particular positions towards the inner periphery and the outer periphery of the magnetic disk 5, and then the average value for each phase is obtained so as to improve the accuracy of the measurement.

The unevenness of pitches or error of each phase is calculated by the CPU 15 in the following manner.

Between phase A and Phase B:

$$E1 = \left(1 - \frac{T1}{T/4}\right) \times 100 \, [\%]$$

That is, the time interval T1 (FIG. 7) is divided by a quarter of the total interval T, the resulting quotient is subtracted from unity, and the resulting difference is converted to a percentage to obtain E1. If the time interval T1 is equal to a quarter of the total interval T, E1 is zero. Otherwise, E1 has some positive or negative value. Similarly, between phase B and phase C:

$$E2 = \left(1 - \frac{T2}{T/4}\right) \times 100 \, [\%]$$

Between phase C and phase D:

$$E3 = \left(1 - \frac{T3}{T/4}\right) \times 100 \, [\%]$$

Between phase D and phase A:

$$E4 = \left(1 - \frac{T4}{T/4}\right) \times 100 \, [\%]$$

B. Calculation of Amount of Compensation for Unevenness of Pitches

If phase A is selected as a reference, while the center of each track for phases B, C, and D is moved, the amount of compensation for each phase is expressed as follows:

*Phase A:* $X1' = 0 \, [\%]$

The compensation calculated for phase A is zero since phase A has been selected as the reference.

*Phase B:* $X2' = -E1 \, [\%]$

The compensation calculated for phase B is equal in absolute value to the unevenness E1. The signs are opposite because the compensation and the unevenness have opposite directional senses.

*Phase C:* $X3' = E3 + E4 \, [\%]$

The compensation required for phase C depends on the cumulative unevenness up to that point, which is complementary to the sum of E3+E4 required to arrive at the next phase A with no compensation.

*Phase D:* $X4' = E4 \, [\%]$

The compensation required for phase D is the same as the residual unevenness E4 required to arrive at the next phase A with no compensation.

The amount of compensation for each phase is thus based on the average pitch and assumes phase A as a reference.

In order to decrease the absolute value of the amount of compensation, the amount of compensation for each phase is optimized so that the sign of the maximum amount of compensation and the sign of the minimum amount of compensation are opposite to each other and the absolute value of the former is set equal to that of the latter. In other words, the amount of compensation for each phase described above is adjusted by a value y calculated as follows:

$$y = (\tfrac{1}{2})(max(X1', X2', X3', X4') + min(X1', X2', X3', X4'))$$

It will be appreciated that y is the average of (a) the maximum of X1' to X4' and (b) the minimum of X1' to X4'. The amount of compensation for each phase as optimized is therefore as follows:

*Phase A:* $X1 = X1' - y \, [\%]$

*Phase B:* $X2 = X2' - y \, [\%]$

*Phase C:* $X3 = X3' - y \, [\%]$

*Phase D:* $X4 = X4' - y \, [\%]$

C. Composition for Nonlinearity of Detection Signal Relative to Head Movement.

As noted above, the head arm 1 is moved at a constant speed and the detection signal of each phase is sampled at equal time intervals.

Figure 8:
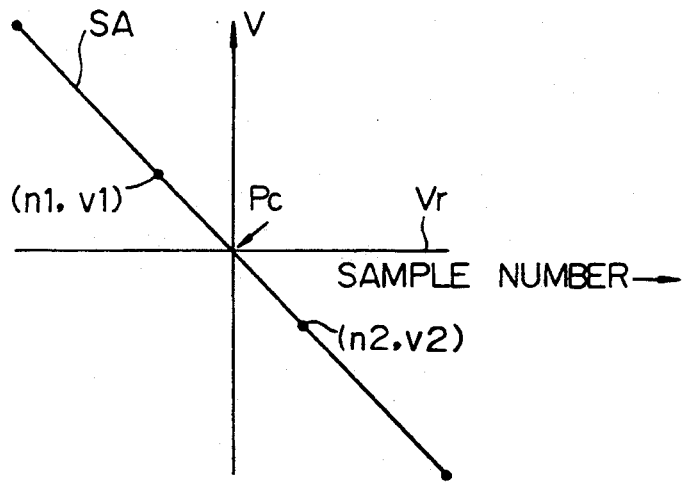

A sampling number N per track is obtained for each phase. The sampling number N per track is ¼ of the total sampling number between a given positive peak of one of the detection signals SA to SD and the next positive peak of the same detection signal (see FIG. 5A line A, for example). As shown in FIG. 8, the sampling number and the sampling values of the sampling points (represented with black dots) around the cross point Pc where the detection signal SA crosses the reference voltage Vr are detected. The cross point Pc corresponds to the center of the track. The sampling point just preceding the cross point Pc has the sampling number n1 and the sampling value V1. The sampling point just following the cross point Pc has the sampling number n2 and the sampling value V2.

Thus, the sampling number nc at the cross point Pc is geometrically calculated or interpolated from the sampling values V1 and V2 as follows:

$$nc = n1 + \frac{V1 - Vr}{V1 - V2}$$

In other words, in order to obtain nc, a fractional quotient (V1−Vr)/(V1−V2) is obtained and added to the sampling number n1.

The sampling number ncr at the compensation point where the compensation X1 [%] has been performed is calculated as follows:

$$ncr = nc - N\frac{X1}{100}$$

Figure 9:
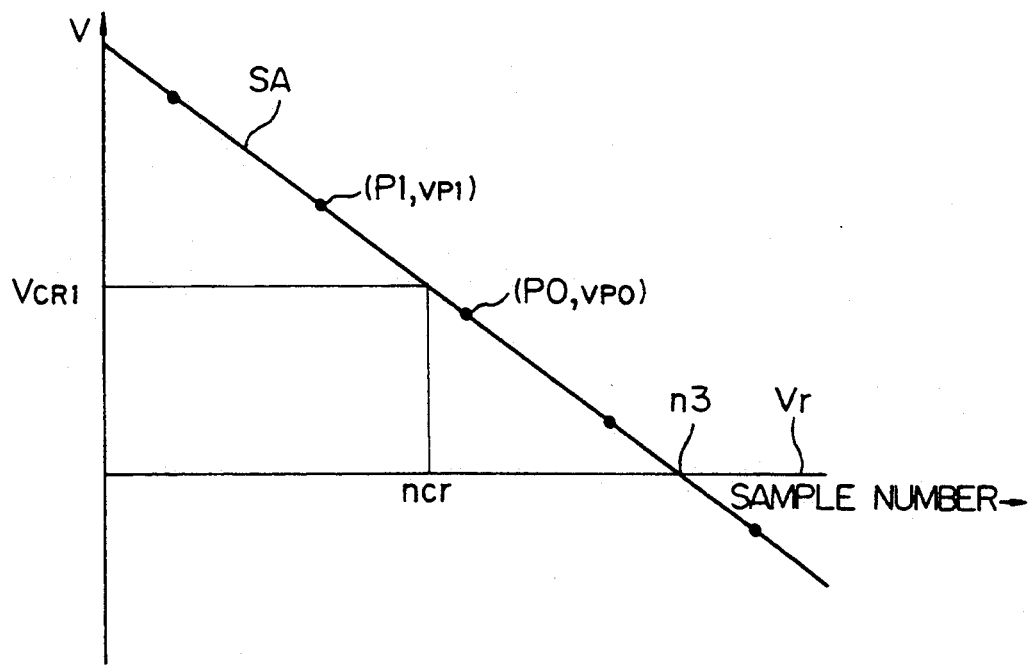

Then as shown in FIG. 9, the voltage $V_{CR1}$ of the detection signal SA at the compensation point is geometrically calculated or interpolated with the following equation:

$$V_{CR1} = V_{P1} + (V_{P0} - V_{P1})p$$

where
p: Value of the decimal part of ncr
$V_{P0}$: Voltage value at P0
$V_{P1}$: Voltage value at P1
P0: Value of N where the decimal part of ncr is rounded down
P1: Value of N where the decimal part of ncr is rounded up With respect to the other phases B, C and D, by using the amounts of compensation X2, X3 and X4 and the detection signals SB, SC, and SD, the voltage values $V_{CR2}$, $V_{CR3}$ and $V_{CR4}$ at their respective compensation points are similarly calculated.

D. Writing the Servo Signal

FIG. 3 illustrates the writing of the servo signal on the reference track. A command St representing the number of tracks to be moved and data Sx of the amounts of compensation $V_{CR1}$ to $V_{CR4}$ calculated with the data of track pitches read from the memory 18 are supplied by the CPU 15 to the servo controller 16.

A drive signal $S_{DR}$ generated in the servo controller 16 is supplied to the voice coil motor 3, and thereby the head arm 1 is rotatably moved until the levels of the detection signals SA to SD become $V_{CR1}$ to $V_{CR4}$, respectively. The 4-phase detection signals SA to SD are sent from the position detector 6 to the servo controller 16, which monitors the levels of the 4-phase signals SA to SD.

A write command Sw is sent from the CPU 15 to the head 2, and the head 2 writes the servo signal from a servo signal generator (not shown in the figure) on the reference tracks in accordance with the amount of compensation determined as explained above. The servo signal is written on the four reference tracks on both the side towards the inner periphery and the side towards the outer periphery. When the servo signal is written on the reference tracks on the side towards the inner periphery, the amount of compensation obtained from the measured value on the inner periphery side is used. When the servo signal is written on the reference tracks on the side towards the outer periphery, the amount of compensation obtained from the measured value on the outer periphery side is used.

Although the unevenness of pitches intrinsic to the position detector 6 is large between different phases, it does not change very much within one phase. Thus, as described above, by compensating the servo signal at just the reference tracks, the position detector can be used with precision.

The present invention provides for recording a servo signal for tracking a disk by using an output of an external position detector. In accordance with the invention, a head arm is moved at a constant speed so as to measure a pitch error of the position detector by using an output signal therefrom. An amount of compensation is calculated by using the error, an output value of the position detector is calculated in accordance with the amount of compensation, and a servo signal is recorded on the disk when the calculated output value of the position detector is obtained. The unevenness of track pitches is thereby fully compensated.

In the embodiment of the invention disclosed above, the reference servo method is described as an example of the invention. However, the present invention is not limited to such an example; the present invention can easily be applied to a sector servo method or an index servo method. In either case, it is possible to determine the amount of compensation for each track. In addition, the unevenness of pitches can be measured not only after the hard disk drive has been assembled, but also with only the position detector 6. Moreover, the present invention can easily be applied to a floppy disk.

According to the present invention, by compensating the unevenness of pitches intrinsic to the position detector, which is an external sensor, a servo signal can be recorded on the disk. The unevenness of pitches can be compensated by considering the nonlinearity of the amount of movement of the head in accordance with the detection signal. Thus, as opposed to the prior art, the pitch accuracy of the tracks of the disk unit does not depend on the pitch accuracy of the position detector. One benefit of the present invention is that the width of the recorded data tracks can be narrowed, thereby more effectively utilizing the recording area of the disk. In addition, since the accuracy of the position detector for detecting track positions can be decreased (i.e., the manufacturing tolerance for the position detector is less critical and can be increased with no overall loss, and even with a gain, of accuracy), the position detector can be produced at a low cost.

Many other modifications of the preferred embodiment of the invention disclosed above will readily occur to those skilled in the art upon considering this disclosure. Accordingly, the invention is not limited except by the appended claims.

I claim:

1. A method of recording a servo signal by which tracks on a disk can be accurately followed by a transducer head, the method comprising the steps of:

mounting on a head arm a position detector that when the head arm is moved at constant speed, produces a multi-phase output signal that is periodic but has a measurable pitch error;

moving the head arm at constant speed;

generating a multi-phase pulsed signal from said multi-phase output signal;

measuring the intervals between pulses of the multi-phase pulsed signal to determine the pitch error;

calculating an amount of compensation required to compensate for the determined pitch error;

calculating values of the multi-phase periodic output signal corresponding to the calculated compensation amount and therefore corresponding to an absence of pitch error in the multi-phase output signal; and recording a servo signal at a location on the disk when a calculated value of the periodic output signal is obtained from the position detector.

2. A method according to claim 1 wherein the position detector comprises a fixed portion and a moveable portion arranged for relative movement therebetween and wherein the relative movement between the fixed and moveable portions of the external position detector corresponds to movement of the transducer head in a radial direction with respective to the disk.

3. A method according to claim 1 wherein the output signal is a four-phase signal.

4. A method according to claim 1 wherein the output signal is a four-phase signal having phases A, B, C and D and the unevenness is calculated as $$E1 = \left(1 - \frac{T1}{T/4}\right) \times 100 \ [\%]$$

$$E2 = \left(1 - \frac{T2}{T/4}\right) \times 100 \ [\%]$$

$$E3 = \left(1 - \frac{T3}{T/4}\right) \times 100 \ [\%]$$

$$E4 = \left(1 - \frac{T4}{T/4}\right) \times 100 \ [\%]$$

where
- E1 = the unevenness between phase A and phase B;
- E2 = the unevenness between phase B and phase C;
- E3 = the unevenness between phase C and phase D;
- E4 = the unevenness between phase D and phase A;
- T corresponds to one period of the four-phase detection signal; and
- T1, T2, T3 and T4 are respectively proportional to the intervals between the four phases.

5. A method according to claim 4 further comprising the steps of taking phase A as a reference and calculating a compensation for each phase as follows:

$$\text{Phase A: } X1' = 0 \ [\%]$$

$$\text{Phase B: } X2' = -E1 \ [\%]$$

$$\text{Phase C: } X3' = E3 + E4 \ [\%]$$

$$\text{Phase D: } X4' = E4 \ [\%].$$

6. A method according to claim 5 further comprising calculating a value:

$$y = (\tfrac{1}{2})(\max(X1', X2', X3', X4') + \min(X1', X2', X3', X4'))$$

and optimizing the amount of compensation for each phase as:

$$\text{Phase A: } X1 = X1' - y \ [\%]$$

$$\text{Phase B: } X2 = X2' - y \ [\%]$$

$$\text{Phase C: } X3 = X3' - y \ [\%]$$

$$\text{Phase D: } X4 = X4' - y \ [\%].$$

7. A method according to claim 6 wherein the calculating of the value of the periodic output signal corresponding to the amount of compensation is done by a process of interpolation.

8. Apparatus for recording a servo signal on a disk for use in enabling a transducer to track the disk accurately, the apparatus comprising:

an external position detector having a fixed portion and a moveable portion relatively movable with respective to each other;

means for establishing a relative movement at a constant speed between the first and second portions of the external position detector to produce a multi-phase, pulsed output signal from the position detector, the first and second portions of the position detector being constructed so that the relative movement at constant speed gives rise to an output signal pattern that is nominally of a given pitch but subject to a pitch error;

means for measuring the intervals between pulses of said multi-phases output signal to determine the pitch error;

means for calculating a correction required to compensate for the pitch and for calculating, in accordance with the amount of the correction, a value of the output signal corresponding to a desired position of a servo signal to be recorded on a disk; and means for recording a servo signal on the disk when the output signal from the position detector becomes equal to the calculated value of the output signal from said means for calculating.

* * * * *